(12) United States Patent
Kamalov et al.

(10) Patent No.: US 7,146,099 B2
(45) Date of Patent: Dec. 5, 2006

(54) METHOD AND APPARATUS FOR OPTICAL SIGNAL AND NOISE ANALYSIS USING PULSE AMPLITUDE HISTOGRAM

(75) Inventors: Valey F. Kamalov, Boca Raton, FL (US); Albrecht Neudecker, Boca Raton, FL (US)

(73) Assignee: Siemens Communications, Inc., Boca Raton, FL (US)

( * ) Notice: Subject to any disclaimer, the term of this patent is extended or adjusted under 35 U.S.C. 154(b) by 785 days.

(21) Appl. No.: 10/287,928

(22) Filed: Nov. 5, 2002

(65) Prior Publication Data

US 2004/0213565 A1 Oct. 28, 2004

(51) Int. Cl.
*H04B 10/08* (2006.01)
*H04B 17/00* (2006.01)

(52) U.S. Cl. .............................. 398/26; 398/27; 398/34; 398/38

(58) Field of Classification Search ................... 398/26, 398/34, 38
See application file for complete search history.

(56) References Cited

U.S. PATENT DOCUMENTS

| | | | |
|---|---|---|---|
| 6,718,138 B1* | 4/2004 | Sugawara | 398/9 |
| 6,907,197 B1* | 6/2005 | Heath et al. | 398/26 |
| 2002/0141010 A1* | 10/2002 | Rodgers et al. | 359/110 |

* cited by examiner

*Primary Examiner*—Jason Chan
*Assistant Examiner*—Nathan Curs

(57) ABSTRACT

In a method of analyzing an optical communications signal, a threshold is established under control of a processor, and a decision circuit compares the amplitude of the signal to the threshold. A counter samples the output of the decision circuit and counts, over many periods of the signal, those samples indicating that the amplitude of the signal is above the threshold. The threshold generating, comparing, and counting are repeated for several thresholds within a range corresponding to an expected amplitude range of the signal. The stored counts and thresholds represent an amplitude histogram $N(V_T)$ for the signal. The derivative $dN/dV_T$ of the function $N(V_T)$ represents the probability density function (PDF) for the signal amplitude and can be used to derive performance information such as bit error rate and optical signal-to-noise ratio (OSNR).

20 Claims, 3 Drawing Sheets

METHOD AND APPARATUS FOR OPTICAL SIGNAL AND NOISE ANALYSIS USING PULSE AMPLITUDE HISTOGRAM

CROSS REFERENCE TO RELATED APPLICATIONS

None

Statement Regarding Federally Sponsored Research or Development

Not Applicable

BACKGROUND OF THE INVENTION

The present invention is related to optical communications systems.

There is a general need in optical communications systems for a function referred to as, "performance monitoring". Performance monitoring generally involves monitoring the quality of optical communications signals at various points in a system to identify signals whose characteristics indicate the need to take some kind of corrective action. Examples of such monitored signal characteristics include signal power, optical signal-to-noise ratio (OSNR), and bit error rate. Corrective actions that can be taken include adjusting transmitter power to improve signal power or OSNR, adjusting or replacing optical filters that may be contributing to noise or excessive signal attenuation, replacing or repairing faulty connections, etc. The need for performance monitoring is particularly great in modern wavelength division multiplexed (WDM) optical communications systems. In WDM systems, many optical communications signals are carried together through optical fibers, optical amplifiers, and other system components. The signals are placed as close together as possible in the frequency domain to obtain high overall capacity of data transmission. Due to the close spacing of many signals, there is a relatively high potential for signals to suffer excessive crosstalk or nonlinear optical pulse distortion, and other deleterious effects. Thus, it is important to monitor signal quality to detect such problems so as to permit corrective action to be taken.

It has been known to use a piece of test equipment referred to as an "optical spectrum analyzer" or OSA to monitor optical signal quality. OSAs provide for accurate measurement of optical signal characteristics such as optical power level and optical noise level. OSAs are intended for use in activities such as initially setting up a communications link, diagnosing faults, and routine maintenance. OSAs are also very expensive.

It has also been known to use a piece of test equipment referred to as optical sampling oscilloscope to monitor optical signal quality. This instrument provides a complete set of measurement capabilities including live waveforms and histograms. Optical sampling oscilloscopes aid designers of high speed transmitter devices and systems. Optical sampling oscilloscopes are also very expensive.

A relatively inexpensive technique for performance monitoring in optical communications system would be desirable.

BRIEF SUMMARY OF THE INVENTION

In accordance with the present invention, a method and apparatus for performance monitoring in optical communications systems is disclosed. The disclosed method and apparatus do not require the use of optical spectrum analyzers (OSAs) or other expensive test components, and therefore provide for reduced cost performance monitoring and concomitant improvement in the cost effectiveness of optical communications systems.

In the disclosed method of analyzing signal and noise characteristics of an optical communications signal, a signal threshold is established under control of a processor, and a decision circuit compares the amplitude of the optical communications signal to the threshold. A counter coupled to the output of the decision circuit counts the number of sampling instants at which the amplitude of the optical communications signal is above the threshold. Sampling can occur at a rate significantly lower compare to the signaling rate of the optical communications signal, and counting occurs over an interval substantially longer than a single sampling period, so that the count accurately reflects pertinent statistics of the signal amplitude. The count that is obtained is stored in association with the threshold.

The processes of generating a threshold, comparing the threshold to the optical communications signal, and counting the occurrence of a given comparison result are repeated for each of several threshold values within a range corresponding to an expected range of amplitudes of the optical communications signal. Thus, if the optical communications signal is expected to have an amplitude in the range from 0 to 500 mV, for example, the range of thresholds might be from 0 to 600 mV. The granularity of the thresholds depends on the degree of precision desired. In a system employing a range of 0 to 600 mV, for example, it may be advantageous to employ thresholds spaced by 5 or 10 mV. For each repetition of the threshold-generating, comparing, and counting processes, the resulting count is stored in association with the threshold at which the count is taken. Upon completion of all repetitions, the stored counts and associated threshold values collectively represent an amplitude histogram $N(V_T)$ that relates a count variable N to a threshold variable $V_T$ over the selected range of thresholds.

As is described in more detail below, the histogram $N(V_T)$ is a form of cumulative distribution function (CDF) for the amplitude of the optical communications signal, and it can be used to derive performance-related information about the optical communications signal such as bit error rate and OSNR. In particular, performance characteristics such as bit error rate and OSNR are readily derived from the probability density function (PDF) for the optical communications signal. An approximation of the PDF is readily obtained by differentiating the histogram $N(V_T)$ that has been constructed in the above manner.

Apparatus for the disclosed technique is generally sufficiently inexpensive that it can be deployed as necessary in an optical communications system without contributing to overall system cost to nearly the same degree as do OSAs, for example. The disclosed apparatus includes a processor for performing calculations and overall control; a circuit such as a digital to analog converter for establishing a voltage threshold under control of the processor; a decision circuit for comparing the threshold to an electrical version of the optical communications signal obtained by optical-to-electrical conversion; and a counter for sampling the output of the decision circuit and counting samples having a predetermined value. The components that make up the disclosed system are all readily available at relatively low cost. Additionally, the disclosed apparatus can be used in conjunction with a tunable filter to enable one circuit to monitor some or all of the optical communications signals constituting a WDM signal.

Other aspects, features, and advantages of the present invention will be apparent from the detailed description that follows.

BRIEF DESCRIPTION OF THE SEVERAL VIEWS OF THE DRAWING

The invention will be more fully understood by reference to the following Detailed Description of the Invention in conjunction with the Drawing, of which.

DETAILED DESCRIPTION OF THE INVENTION

Figure 1:
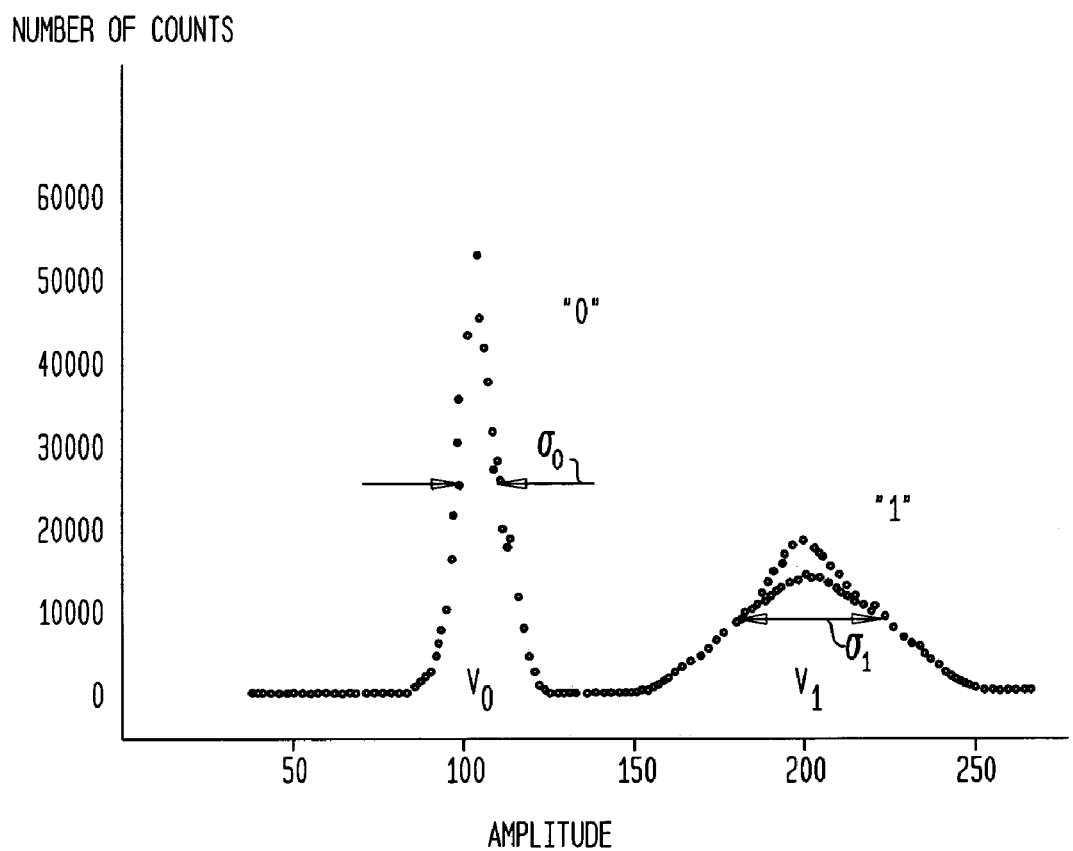
FIG. 1 is a probability density function for the amplitude of a communications signal received at a receiver with synchronous sampling in an optical communication system as is known in the art.

FIG. 1 shows a probability density function (PDF) for the amplitude of an optical signal at a receiver in an optical communications system. The PDF indicates the relative occurrence rates for signal amplitudes with a given range in a certain operating environment. The plot of FIG. 1, for example, which was obtained with synchronous sampling using an optical sampling oscilloscope, depicts a distribution of signal amplitudes that might be expected on an OC-192 link with an optical signal-to-noise ratio (OSNR) of 17 dB. In an ideal communications link with no noise, the plot would have only two non-zero points—one corresponding to the logic "0" amplitude and another corresponding to the logic "1" amplitude. The existence of relatively narrow curved regions around these two amplitudes in FIG. 1 is due, among other things, to the effects of noise.

A plot such as FIG. 1 can be used to derive certain attributes of an optical communications signal. If $V_1$ and $V_0$ are taken to be the mean signal amplitudes corresponding to the "1" and "0" logic levels, and $\sigma_1$ and $\sigma_0$ are taken to be the standard deviations of these amplitudes, then the quality or "Q" of a signal can be expressed as follows:

$$Q=(V_1-V_0)/(\sigma_1=\sigma_0)$$

OSNR can be calculated from Q in a known manner.

Additionally, if T is a threshold amplitude defining the boundary between logic 0 and logic 1 levels, then the bit error rate (BER) can be expressed as a function of T as follows:

$$BER(T)=\tfrac{1}{2}\{erfc(|V_1-T|/\sigma 1)+erfc(|T+V_2|/\sigma_0)\}$$

where erfc is the complementary error function.

It is known to measure a PDF such as that of FIG. 1 using an optical sampling oscilloscope, for example.

Figure 2:
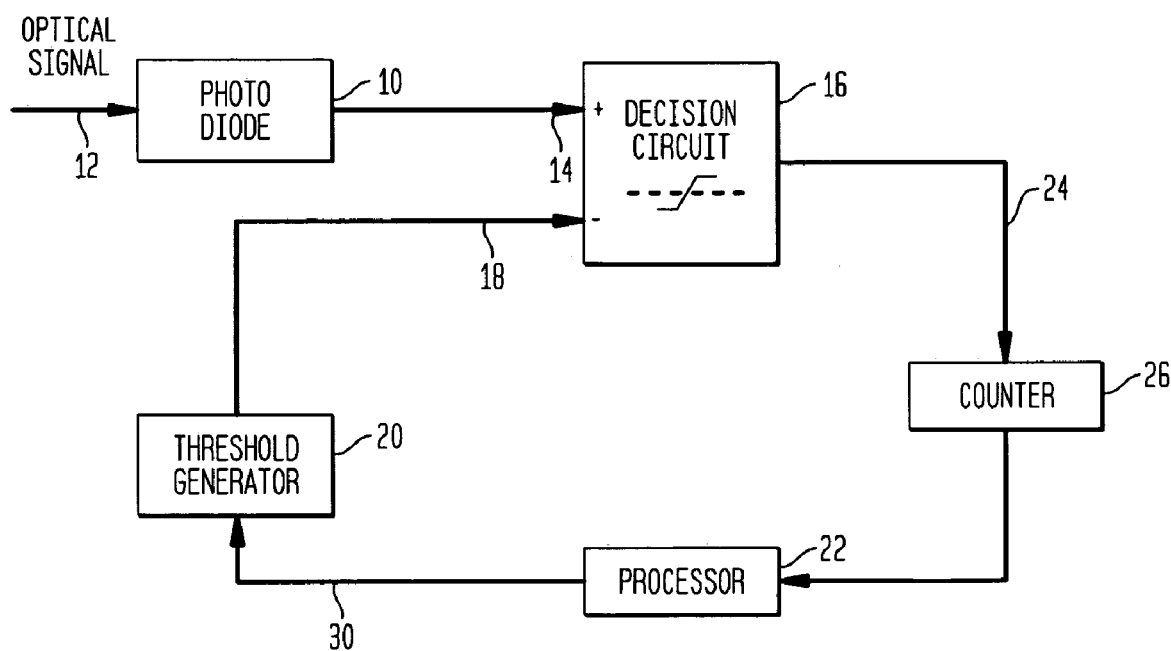
FIG. 2 is a block diagram of a system for performing optical signal and noise analysis in accordance with the present invention.

FIG. 2 shows a system that can be used collect a histogram of received signal amplitudes from which a derivative function can be calculated that approximates the PDF for an optical signal. A photodiode 10 converts a received optical communications signal 12 into a corresponding electrical signal 14 which is supplied to one input of a decision circuit 16. The decision circuit 16 may be realized, for example, using a high-speed comparator. The other input to the decision circuit 16 is a threshold signal 18 generated by a threshold generator 20 under the control of a processor 22. The threshold generator 20 may be realized, for example, using a digital-to-analog converter. The output 24 of the decision circuit 16 is supplied to a counter 26, and the output 28 of the counter 26 is supplied to the processor 22. The processor 22 controls the operation of the threshold generator 20 via a control signal or bus 30.

Although not shown in FIG. 2, the apparatus of FIG. 2 may be utilized in conjunction with other components to carry out performance monitoring in desired ways. For example, it will generally be desired to operate on only a fraction of the actual optical communications signal that is carried from transmitter to receiver in a system. It is common to use a device known as a "splitter" to direct a specified percentage of the signal energy to the performance monitoring system. A common example of such a splitter is a "95/5" splitter, which directs 95% of the signal energy along the main communications path and 5% to ancillary equipment such as a performance monitoring system. In a WDM system, it is necessary to apply optical filtering so as to obtain only one component signal of interest for performance monitoring. Such a filter would typically be placed between a location on the main path for a WDM signal, such as the input of a receiver, and the input to the photodiode 10 or other optical-to-electrical conversion device of the performance monitoring system. To carry out performance monitoring of some or all of the component signals of a WDM signal, it may be advantageous to employ a tunable filter that can be selectively tuned to each component signal in turn for analysis. Such filters are known in the art.

The operating characteristics of the various components in the circuit of FIG. 2 depend on the characteristics of the optical signal 12 being analyzed. For example, the threshold generator 20 must be capable of generating a threshold signal 18 having a range of values corresponding to the range of values of the photodiode output signal 14, which in turn is dependent on the expected range of amplitudes of the optical signal 12. The number of discrete values of the threshold signal 18 is chosen based on desired measurement resolution. The decision circuit 16 must operate sufficiently fast to accurately track the instantaneous relationship between the photodiode output signal 14 and the threshold signal 18. The counter 26 can sample the decision circuit output 24 at a sampling rate significantly lower than the signaling rate of the optical signal 12. For example, in the case of an OC-192 signal having a signaling rate of 9.95 Gb/s, the sampling rate could be in the MHz range.

Figure 3:
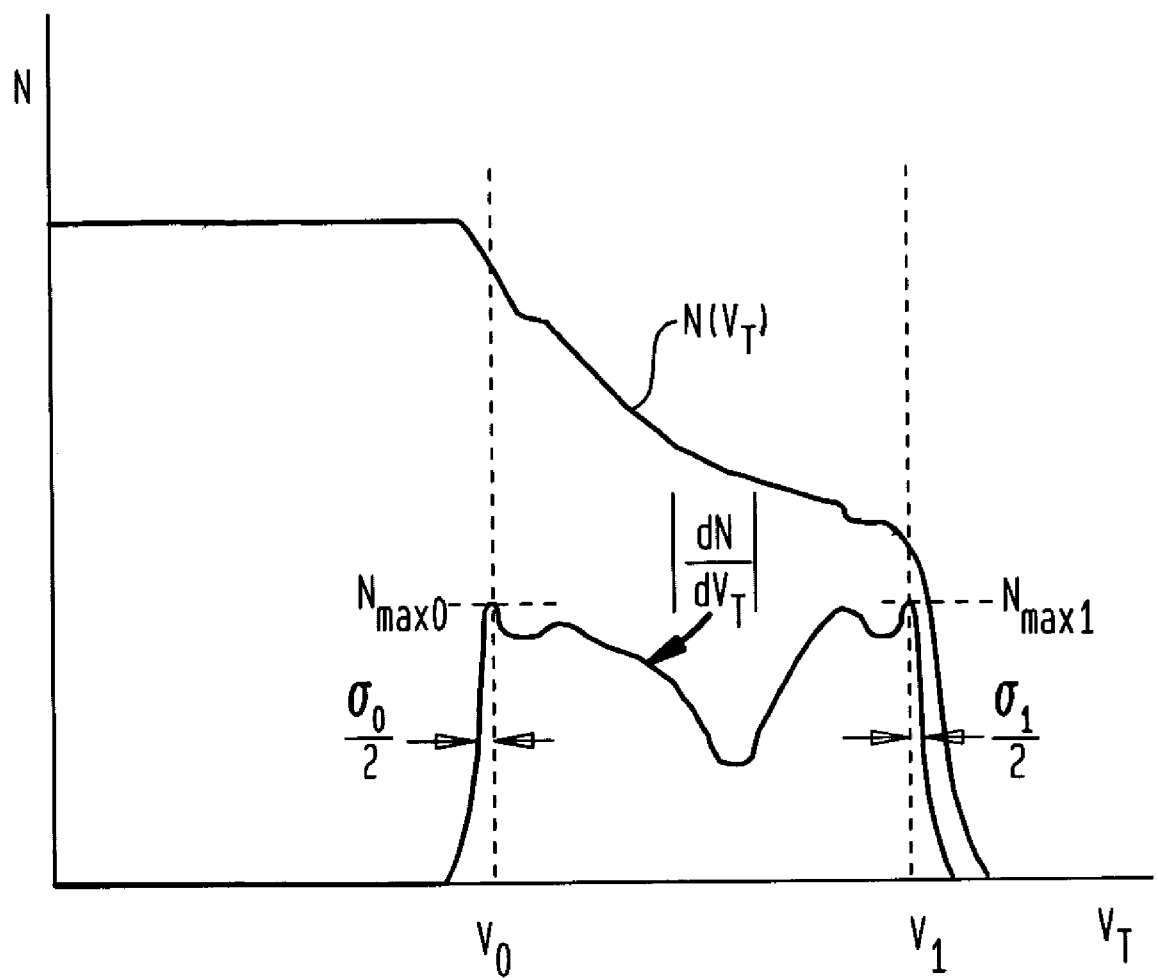
FIG. 3 shows a histogram $N(V_T)$ and its derivative $dN/dV_T$ for received signal amplitude as calculated in the system of FIG. 2.

FIG. 3 illustrates an example of a histogram $N(V_T)$ as well as the magnitude of its derivative $|dN/dV_T|$ as calculated by the apparatus of FIG. 2 for an optical communications signal, where $V_T$ represents the threshold signal 18 generated by the threshold generator 20. The plot of $N(V_T)$ indicates, for each value of the threshold signal $V_T$, the number of received optical pulses N having a magnitude greater than $V_T$ (after optical to electrical conversion). Although the plot of FIG. 3 has a continuous shape, in practice the plot $N(V_T)$ will generally be composed of discrete values.

It will be observed that the histogram $N(V_T)$ has several regions of relatively steep drop-off which coincide with the maxima of the derivative $|dN/dV_T|$ as shown. It will be further observed that the derivative $|dN/dV_T|$ resembles the PDF of FIG. 1 in the regions VT>V1, and VT<V0. This similarity exists because the histogram $N(V_T)$ in fact is a form of cumulative density function (CDF) for the received signal amplitude. A CDF by definition is a function obtained by integrating a PDF. Thus, differentiating the histogram $N(V_T)$ yields a representation $|dN/dV_T|$ of the PDF of the received signal amplitude. The derivative $|dN/dV_T|$ is essentially different from the PDF of FIG. 1 in the range V0<VT<V1. The difference is due to the asynchronous sampling used in the case of FIG. 3. Both the rising and falling edges of the telecommunication pulse contribute to the amplitude distribution, resulting in the complicated structure of $|dN/dV_T|$ in the range V0<VT<V1.

Shown in FIG. 3 are values $\sigma_0/2$ and $\sigma_1/2$ that represent the respective half-widths at half maximum of the two regions of the function $|dN/dV_T|$ that correspond to logic "0" and logic "1" in the optical signal 12. The half-width corresponding to logic "0" is the difference between the voltage V0 and the voltage at which the value of the leading edge of $|dN/dV_T|$ is equal to $\frac{1}{2}$ of $N_{max0}$, and the half-width corresponding to logic "1" is the difference between the voltage at which the value of the trailing edge of $|dN/dV_T|$ is equal to $\frac{1}{2}$ of $N_{max1}$ and the voltage V1. The half-widths are used instead of the full widths because of the affects of asynchronous sampling on the curve $|dN/dV_T|$. Asynchronous sampling introduces "edge" counts in the region in between V0 and V1. Those edge counts are due to both rise and fall of the telecommunication pulse. Neither the area VT>V1 nor the area VT<V0 is affected by the rise and fall of the pulse. Therefore, those areas are used to calculate the half-widths of "0" and "1", $\sigma_0/2$, and $\sigma_1/2$, respectively.

Figure 4:
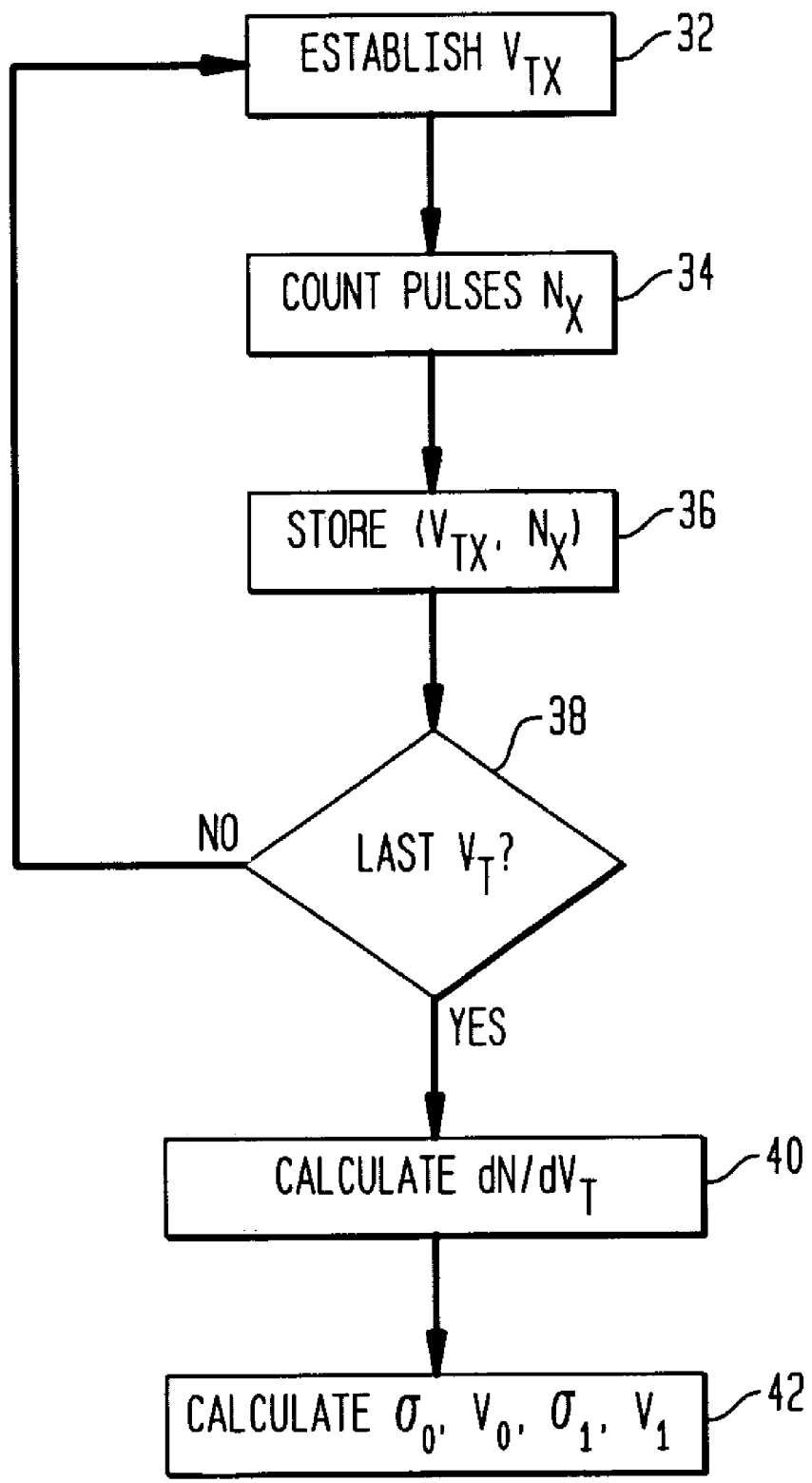
FIG. 4 is a flow diagram of the process for calculating a histogram such as the histogram of FIG. 3 in the system of FIG. 2.

FIG. 4 illustrates the process of calculating the functions $N(V_T)$ and $|dN/dV_T|$. In FIG. 4, the subscript "x" is used to indicate each repetition of a loop of operations. The process begins at step 32 with establishing a threshold voltage $V_{TX}$. At step 34, a count $N_x$ is collected of the number of logic "1's" sampled at the output 24 of the decision circuit 16 over a predetermined counting interval. The counting interval is selected to be sufficiently long to collect meaningful signal statistics. The counting interval can vary depending on a variety of factors, including the signaling rate, the noise bandwidth, the sampling rate, etc.

At step 36, the pair of numbers $(V_{TX}, N_x)$ is stored. At step 38, it is determined whether this is the last threshold voltage $V_T$ for which a count is to be gathered, i.e., whether "x" has reached its maximum value. If not, the loop of steps 32–38 is repeated, with new pairs $(V_{TX}, N_x)$ being saved at each execution of step 36. When the last threshold voltage $V_T$ is reached in step 38, the set of pairs $\{V_{TX}, N_x\}$ for all repetitions represents the discrete-valued function $N(V_T)$ for the optical signal 12.

At step 40, the derivative function $dN/dV_T$ is calculated from $N(V_T)$. Then, at step 42, the values $\sigma_0/2$, $\sigma_1/2$, $V_0$, and $V_1$ are calculated as described above. The values σ0 and σ1 are calculated by multiplying the values $\sigma_0/2$ and $\sigma_1/2$ by 2. The values σ0 and σ1 represent the respective FWHM (full widths at half maximum) of the probability density function for the amplitude of a communication signal that correspond to logic "0" and logic "1". Then, as described above, the values $\sigma_0$, $V_0$, $\sigma_1$, and $V_1$ can be used in calculating Q and OSNR.

While an embodiment has been discussed above in terms of an OC-192 signal, the invention is not limited to use with optical signals of any particular signaling rate. Additionally, although in the above description the samples counted by the counter are those that indicate that the amplitude of the optical communications signal exceeds the threshold, in alternative embodiments samples that indicate that the amplitude of the optical communications signal is less than the threshold may be counted.

It will be apparent to those skilled in the art that modifications to and variations of the disclosed methods and apparatus are possible without departing from the inventive concepts disclosed herein, and therefore the invention should not be viewed as limited except to the full scope and spirit of the appended claims.

What is claimed is:

1. A method of analyzing signal and noise characteristics of an optical communications signal, comprising:
    establishing a threshold;
    comparing the optical communications signal to the threshold to generate a comparison result signal, the comparison result signal having a predetermined binary value when respective amplitudes of the optical communications signal and the threshold satisfy a predetermined comparison relationship;
    counting, over a count interval substantially longer than a signaling period of the optical communications signal, a count of sampling instants at which the comparison result signal has the predetermined binary value, the count being stored in association with the threshold;
    repeating the threshold establishing, comparing, and counting for each of a range of thresholds corresponding to an expected range of amplitudes of the optical communications signal, the count and threshold from each repetition being stored in mutual association, the stored counts and thresholds from all repetitions collectively representing a function $N(V_T)$ relating a count variable N to a threshold variable $V_T$ over the range of thresholds;
    calculating, from the stored counts and thresholds, a derivative function $dN/dV_T$ of the function $N(V_T)$; and
    utilizing predetermined parameters of the derivative function $dN/dV_T$ to calculate two half widths of two curve portion of the derivative function $dN/dV_T$, the half-widths being used to calculate a signal quality for the optical communications signal, the optical communications signal being adjusted according to the calculated signal quality.

2. A method according to claim 1, wherein the predetermined parameters of the derivative function $dN/dV_T$ include a parameter corresponding to a distribution of amplitudes of logic ones in the optical communications signal and a parameter corresponding to a distribution of amplitudes of logic zeroes in the optical communications signal.

3. A method according to claim 1, wherein the signal quality includes an estimated bit error rate for the optical communications signal.

4. A method according to claim 1, wherein the signal quality includes a signal quality indicator for the optical communications signal.

5. A method according to claim 4, wherein the signal quality indicator can be utilized to calculate an optical signal-to-noise ratio (OSNR) for the optical communications signal.

6. A method according to claim 1, wherein the predetermined comparison relationship is that the amplitude of the optical communications signal exceeds the threshold.

7. A method according to claim 1, wherein the predetermined binary value is "1".

8. A method according to claim 1, wherein the optical communications signal is a relatively low-power signal obtained from a higher-power signal by use of an optical splitter.

9. A method according to claim 1, wherein the optical communications signal is one component signal of a wavelength-division-multiplexed (WDM) optical communications signal, the component signal being obtained from the WDM optical communications signal by wavelength filtering.

10. A method according to claim 1, wherein the optical communications signal is one component signal of a wavelength-division-multiplexed (WDM) optical communications signal, the component signal being obtained from the WDM optical communications signal by tunable wavelength is filtering, and further comprising repeating the steps of claim 1 for each of a plurality of other component signals of the WDM signal using a tunable filter to obtain each respective optical communications signal for analysis.

11. Apparatus for analyzing signal and noise characteristics of an
optical communications signal, comprising:
a processor;
a threshold establishing circuit operative to establish a value of a threshold signal under control of the processor;
a decision circuit operative to compare the threshold signal to the optical communications signal to generate a comparison result signal, the comparison result signal having a predetermined binary value when respective amplitudes of the optical communications signal and the threshold satisfy a predetermined comparison relationship; and
a counter operative, over a count interval substantially longer than a signaling period of the optical communications signal, to obtain a count N of sampling instants at which the comparison result signal has the predetermined binary value, the count for each count interval being provided to the processor; wherein the processor is operative (i) to store the count N in association with the threshold, (ii) to cause a repetition of respective operations of the threshold establishing circuit, the decision circuit, and the counter for each of a range of thresholds corresponding to an expected range of amplitudes of the optical communications signal, the count and threshold from each repetition being stored by the processor, the stored counts and thresholds collectively representing a function $N(V_T)$ relating a count variable N to a threshold variable $V_T$ over the range of threshold, (iii) to calculate, from the stored counts and thresholds, a derivative function $dN/dV_T$ of the function $N(V_T)$, and (iv) to utilize predetermined parameters of the derivative function $dN/dV_T$ to calculate two half-widths of two curve portions of the derivative function $N/dV_T$, and (v) to calculate a signal quality for the optical communications from the half-widths, and wherein the optical communications signal is adjusted according to the calculated signal quality.

12. Apparatus according to claim 11, wherein the predetermined parameters of the derivative function $dN/dV_T$ utilized by the processor include a parameter corresponding to a distribution of amplitudes of logic ones in the optical communications signal and a parameter corresponding to a distribution of amplitudes of logic zeroes in the optical communications signal.

13. Apparatus according to claim 11, wherein the processor is further operative to utilize the signal quality to calculate an estimated bit error rate for the optical communications signal.

14. Apparatus according to claim 11, wherein the processor is further operative to utilize the signal quality to calculate a signal quality indicator for the optical communications signal.

15. Apparatus according to claim 14, wherein the signal quality indicator can be utilized to calculate an optical signal-to-noise ratio (OSNR) for the optical communications signal.

16. Apparatus according to claim 11, wherein the predetermined comparison relationship is that the amplitude of the optical communications signal exceeds the threshold.

17. Apparatus according to claim 11, wherein the predetermined binary value is "1".

18. Apparatus according to claim 11, wherein the optical communications signal is a relatively low-power portion of a higher-power signal, and further comprising a splitter operative to obtain the optical communications signal from the higher-power signal.

19. Apparatus according to claim 11, wherein the optical communications signal is one component signal of a wavelength-division-multiplexed (WDM) optical communications signal, and further comprising a wavelength filter operative to obtain the one component signal from the WDM optical communications signal.

20. Apparatus according to claim 11, wherein the optical communications signal is one component signal of a wavelength-division-multiplexed (WDM) optical communications signal, and further comprising a tunable wavelength filter operative to obtain the one component signal from the WDM optical communications signal, and wherein the processor is further operative to process each of a plurality of other component signals of the WDM signal using a tunable filter.

* * * * *